United States Patent [19]
McPhail

[11] 3,914,449
[45] Oct. 21, 1975

[54] METHOD FOR INTRODUCING MATERIALS INTO OR REMOVING MATERIALS FROM A HERMETICALLY SEALED VESSEL

[75] Inventor: Joe L. McPhail, Houston, Tex.

[73] Assignee: Pfeffer & Son, Harris County, Tex.

[22] Filed: Dec. 17, 1973

[21] Appl. No.: 425,568

Related U.S. Application Data

[60] Continuation of Ser. No. 68,969, Sept. 2, 1970, abandoned, which is a division of Ser. No. 711,425, March 7, 1968, Pat. No. 3,554,114.

[52] U.S. Cl. ............ 426/461; 426/460; 426/462; 426/508; 214/17 B
[51] Int. Cl.² ...................................... A23L 1/01
[58] Field of Search .......... 426/508, 460, 461, 462; 214/17 B

[56] References Cited
UNITED STATES PATENTS

| | | | |
|---|---|---|---|
| 748,414 | 12/1903 | Passburg | 214/17 B |
| 955,606 | 4/1910 | Moreau | 214/17 B |
| 2,276,950 | 3/1942 | Faller | 214/17 B |
| 2,567,447 | 9/1951 | Ramsden et al. | 426/508 |
| 3,315,824 | 4/1967 | Kirchhoefer | 214/17 B |
| 3,347,741 | 10/1967 | Hutchison | 214/17 B |

*Primary Examiner*—Norman Yudkoff
*Assistant Examiner*—Curtis P. Ribando
*Attorney, Agent, or Firm*—Schuyler, Birch, Swindler, McKie & Beckett

[57] ABSTRACT

An apparatus for introducing materials into and removing materials from a hermetically seated vessel without destroying the hermetic integrity of the vessel comprising, a container defining a chamber therein which chamber communicates between the vessel and an environment having a dissimilar pressure, four valve means each operatively connected to the container and communicating between the interior and exterior thereof, and means for cyclically actuating said valve means so that the pressure within the chamber is equalized to the pressure within the vessel before the materials are transferred between the container and the vessel, and the pressure within the chamber is equalized to said dissimilar pressure before the materials are transferred between the container and said dissimilar pressure environment.

17 Claims, 7 Drawing Figures

INVENTOR
JOE L. McPHAIL

ATTORNEYS

Fig. 6.

METHOD FOR INTRODUCING MATERIALS INTO OR REMOVING MATERIALS FROM A HERMETICALLY SEALED VESSEL

REFERENCE TO RELATED APPLICATIONS

This application is a continuation of copending application Ser. No. 68,969, filed Sept. 2, 1970 now abandoned, which is a division of application Ser. No. 711,425, filed Mar. 7, 1968, now Pat. No. 3,554,114.

BACKGROUND OF THE INVENTION

1. Field of the Invention

This invention relates to an apparatus which provides acess to the interior of a hermetically sealed vessel for introducing materials into or removing materials from the vessel without destroying its hermetic integrity. Specifically, the invention concerns an apparatus for communicating between a hermetically sealed vessel and an environment having a dissimilar pressure, wherein the pressure within the apparatus is sequentially equalized to the pressure within the vessel and the pressure of the environment so that materials may be transferred to or from the vessel from or to the environment through said apparatus without destroying the hermetic integrity of the vessel.

2. Description of the Prior Art

Many industrial processes of a continuous nature include one or more steps in which a material in treated in an atmosphere having a pressure that is either greater or lesser than ambient pressure. Generally, such steps are carried out within hermetically sealed vessels.

A particularly troublesome problem associated with the use of such a vessel in a continuous process is the necessity for introducing and removing the materials to be treated from the vessel without destroying its hermetic integrity. One well-known means used for accomplishing this function is a rotary valve. Such valves basically comprise a valve body and a rotatably mounted closure member which is positioned within the cavity defined by the body. Generally, the closure member has a plurality of radially extending paddles which divide the cavity into a plurality of individual compartments. As the closure member rotates, the compartments rotate about the central axis of the member. Each compartment sequentially moves past the valve inlet where the materials to be treated are introduced therein, and then past the valve outlet where the materials are discharged therefrom into a hermetically sealed vessel.

Ideally, each of the compartments in hermetically sealed from the other compartments so that the hermetic integrity of the vessel will be maintained. In order to approach this ideal condition, however, the clearance between the valve body and closure member must be extremely small, yet sufficient clearance must be provided for the closure member to rotate within the body. Any slight expansion or contraction of the valve body and closure member relative to each other results either in the closure member scraping against the body or in gases escaping around the closure member.

Frequently, the materials being handled and/or one or both of the environments between which the valve communicates are maintained at an elevated temperature, causing the metallic structural elements of the valve to expand. In such instance, the aforementioned operating difficulties are magnified.

Moreover, rotary valved are extremely expensive to manufacture. The cavity within the valve body and the paddles of the closure member must be carefully machined to insure that a minimum clearance is provided therebetween when the elements are assembled. Frequently, the maximum acceptable clearance is .005 inch or less. In addition, due to the aforementioned operating difficulties, such valves require frequent maintenance, resulting in expensive process stoppages as well as necessitiating costly repair work.

Thus, a long felt need has existed for a means for introducing and removing materials from hermetically sealed vessels without destroying the hermetic integrity thereof, which means is economical to operate and manufacture, and which requires a minimum of maintenance.

SUMMARY OF THE INVENTION

The present invention offers an optimum solution to the problems associated with the known means for introducing and removing materials from hermetically sealed vessels without destroying the hermetic integrity thereof.

Basically, the apparatus of the invention comprises, a container defining a chamber therein, which chamber communicates between a hermetically sealed vessel and an environment having a pressure dissimilar from the pressure within the vessel, a first valve means connected to the container and communicating between said chamber and the exterior of the container for admitting materials into the chamber, a second valve means connected to the container and communicating between said chamber and the exterior of the container for discharging materials from the chamber, a third valve means operatively connected to the container and adapted to communicate between said chamber and said vessel so that the pressure within the chamber may be equalized to the pressure within the vessel, a fourth valve means operatively connected to the container and adapted to communicate between said chamber and said dissimilar pressure environment so that the pressure within the chamber may be equalized to said dissimilar pressure, and means for cyclically actuating the valve means so that the pressure within the chamber will be equalized to the pressure within the vessel before the materials are transferred between the container and the vessel, and the pressure within the chamber will be equalized to said dissimilar pressure before the materials are transferred between the container and said dissimilar pressure environment.

The method of the invention essentially comprises the steps of equalizing the pressure within a hermetically sealed chamber to the pressure of a first environment from which materials are to be delivered to the chamber, transferring the materials into the chamber, equalizing the pressure within the chamber to the pressure of a second environment to which the materials are to be discharged from the chamber, transferring the materials into the second environment, and cyclically repeating the aforementioned steps for a protracted period of time.

The container of the apparatus of the invention may be of any desired configuration, and conveniently comprises a short length of cylindrical pipe having sufficient internal volume for holding the quantity of material desired to be introduced into or discharged from a hermetically sealed vessel at one time. Conveniently, the first and second valve means are positioned at opposite sides of the container such as at each end of a cylindrical pipe section, and preferably comprise quick-acting valves, such as butterfly or slide valves.

The third and fourth valve means are individually operatively connected to the container at any convenient locations, such as at different locations on the wall of a cylindrical pipe section, and also preferably comprise quick-acting valves, such as butterfly or ball valves.

The actuating means for the valve means preferably includes power means for opening and closing the valve means, and a programmer for energizing the power means in the proper sequence. The power means may comprise any suitable hydraulic, pneumatic or electrical actuators, and the programmer may comprise any suitable electric mechanical, electronic or electro fluidic programming device.

With the foregoing in mind, it is an object of the present invention to provide an apparatus for introducing materials into and removing materials from a hermetically sealed vessel without destroying the hermetic integrity of the vessel.

It is another object of the invention to provide a method for introducing materials into and removing materials from a hermetically sealed vessel without destroying the hermetic integrity of the vessel.

It is a further object of the invention to provide an apparatus having an internal chamber which communicates between two environments having dissimilar pressures and through which materials may be transferred from one environment to the other while maintaining the hermetic integrity of both environments.

It is yet another object of the invention to provide an apparatus which is particularly adapted for transferring materials between two environments having dissimilar pressures without destroying the hermetic integrity of either environment, wherein the materials and/or one or both of the environments is maintained at an elevated temperature.

It is still another object of the invention to provide an apparatus which includes a container, four valve means independently communicating therewith and means for sequentially operating the valve means so that materials may be transferred through the container and between two environments having dissimilar pressures without destroying the hermetic integrity of either environment.

It is yet a further object of the invention to provide an apparatus for introducing materials into and removing materials from a hermetically sealed vessel without destroying the hermetic integrity of the vessel, which apparatus is economical to manufacture, operate and maintain.

These and other objects of the invention will become apparent upon a consideration of the detailed description of a preferred embodiment thereof given in connection with the following drawings.

DESCRIPTION OF THE PREFERRED EMBODIMENT

Figure 3:
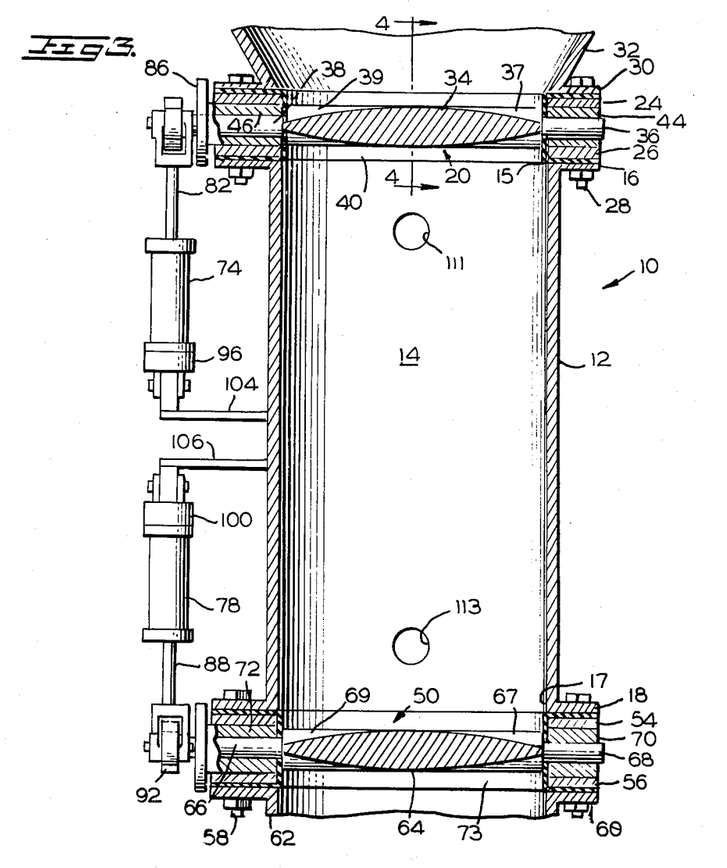
FIG. 3 is a sectional view taken on line 3—3 of FIG. 1.
Figure 4:
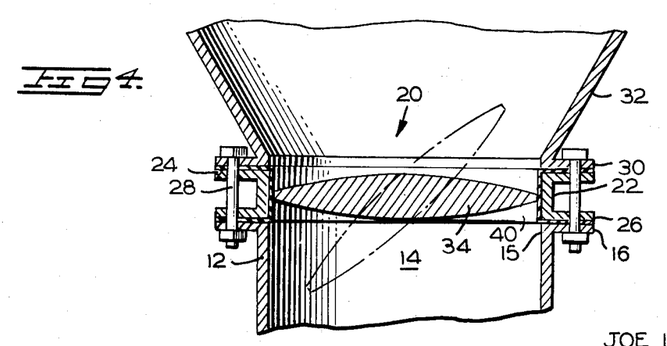
FIG. 4 is a sectional view taken on line 4—4 of FIG. 3.

A preferred embodiment of the apparatus of the invention is shown in FIG. 1-4, as designated by reference numeral 10. Apparatus 10 includes a container 12 defining a chamber 14 therein (FIGS. 3 and 4). Container 12 may be of any desired configuration and conveniently comprises a short section of cylindrical pipe. The size of container 12 is selected so that the volume of chamber 14 is sufficient to hold all of the material desired to be introduced into or removed from a hermetically sealed vessel at one time.

As shown in FIGS. 1-4, apparatus 10 is installed between the lower end of a feed hopper 32 and the upper end of a hermetic vessel 62 for transferring materials, either liquids or particulate solids, from the feed hopper to the vessel. Typically, feed hopper 32 is exposed to the environment of the ambient atmosphere and the interior of vessel 62 in maintained pressure that is either greater or lesser than ambient pressure.

Container 12 has an upper opening 15 surrounded by a flange 10 and a lower opening 17 surrounded by a flange 18. As shown in FIG. 3, upper opening 15 is vertically aligned with an opening in the lower end of feed hopper 32, and lower opening 17 is vertically aligned with an opening in the upper end of vessel 62 so that material will freely pass from the feed hopper into chamber 14 and from the chamber into the vessel under the influence of gravity.

A first valve means, such as quick-acting butterfly valve 20, is connected to container 12 at upper opening 15 thereof and communicates between chamber 14 and the exterior of the container, specifically the interior of hopper 32. Valve 20 includes a cylindrical valve body 22 having a pair of flanges 24 and 26 attached at opposite ends thereof. Flange 26 of valve body 22 abuts flange 16 of container 12 to align valve 20 centrally of opening 15.

Flange 24, disposed at the other end of valve body 22, abuts a flange 30 which is affixed to the lower end of feed hopper 32 and surrounds the opening therein. Flanges 21 and 30, and 26 and 16 are secured in abutting relationship by appropriate fasteners, such as by bolts 28.

Valve 20 also includes a disc shaped closure member 34 which is rotatably mounted within valve body 22 by a pair of opposed stubshafts 36 and 38. The stubshafts are secured to a pair of diametrically opposed, radially extending shaft supports 37 and 30 formed integrally with closure member 34, and are journalled in suitable bushings 44 and 40 secured between flanges 24 and 26 of the valve body. In the closed position, closure member 34 seats against a resilient annular liner (such as rubber) 40 which is affixed to valve body 22 contiguous to the inside wall thereof. When closure member 34 is moved to the closed position, as shown in solid lines in FIG. 4, liner 40 insures that chamber 14 will be hermetically insolated from feed hopper 32.

A second valve means, such as quick acting butterfly valve 50, is connected to container 12 at lower opening 17 thereof and communicates between chamber 14 and the exterior of the container, specifically the interior of vessel 62. Valve 50 is structurally identical to valve 20 and includes a cylindrical valve body 52 having a pair of flanges 54 and 56 attached at opposite ends thereof. Flange 54 of valve body 52 abuts flange 18 of container 12 to align valve 50 centrally of opening 17.

Flange 56, disposed at the other end of valve 52, abuts a flange 60 which is affixed to the upper end of vessel 62 and surrounds the opening therein. Flanges 56 and 60, and 54 and 18 are secured in abutting relationship by appropriate fasteners, such as by bolts 58.

Valve 50 also includes a dis-shaped closurer member 64 which is rotatably mounted within valve body 52 by a pair of stubshafts 66 and 68. The stubshafts are secured to a pair of diametrically opposed, radially extending shaft supports 67 and 69 formed integrally with closure member 64, and are journalled in suitable bushings 70 and 72 secured between flanges 54 and 56 of the valve body. In the closed position, closure member 64 seats against a resilient annular liner (such as rubber) 73 which is affixed to valve body 52 contiguous to the inside wall thereof. When closure member 64 is moved to the closed position. Liner 73 insures that chamber 14 will be hermetically isolated from vessel 62.

Figure 1:
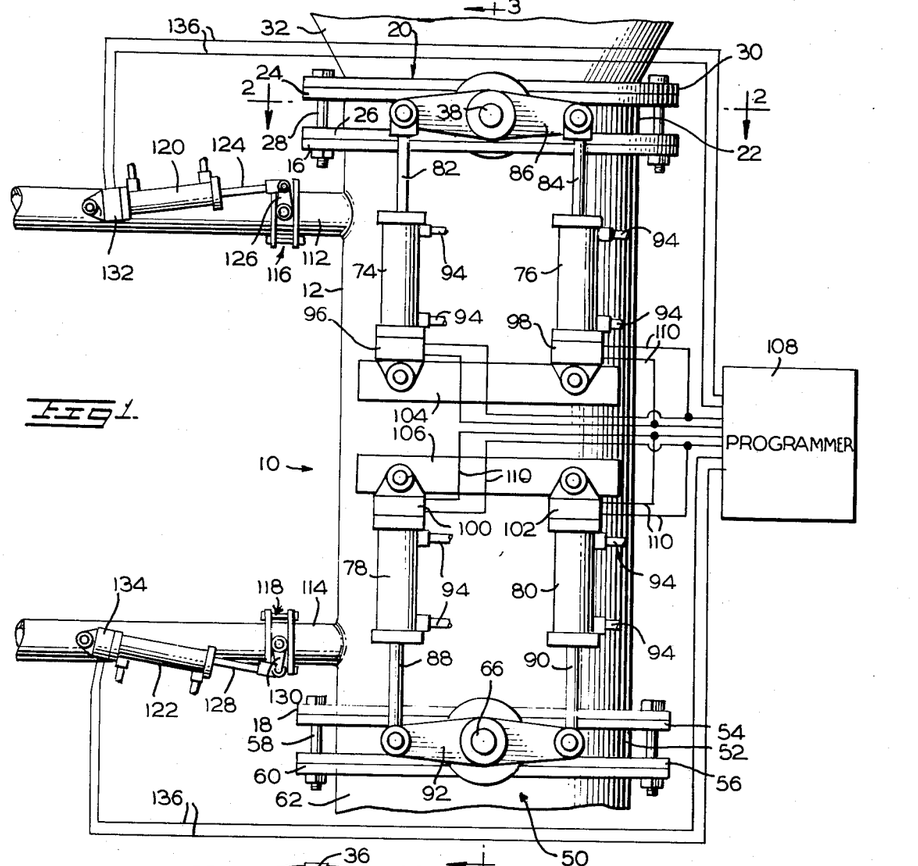
FIG. 1 is an elevational view of a preferred embodiment of the apparatus of the invention.
Figure 2:
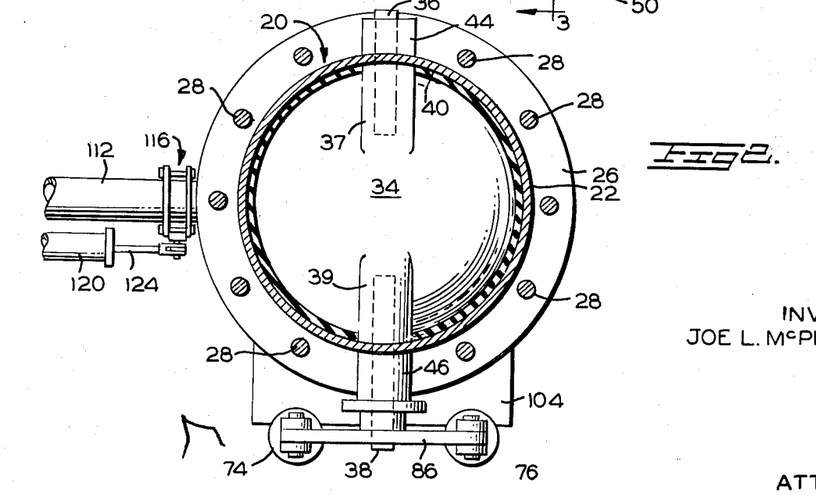
FIG. 2 is a sectional view taken on line 2—2 of FIG. 1.

Apparatus 10 also includes actuating means for operating valves 20 and 50. Such means conveniently includes power means for opening and closing the valves, such as a pair of pneumatic expansible-chamber actuators 74 and 76 for actuating valve 20, and a similar pair of actuators 78 and 80 for actuating valve 50. Actuators 74 and 76 are operatively connected to closure member 34 of valve 20 by connecting rods 82 and 84, respectively, and a rocker arm 86 which is affixed to the end of stubshaft 38. As shown in FIG. 1, the ends of connecting rods 82 and 84 are pivotally connected to the opposite ends of arm 86 so that as the connecting rods move in and out of actuators 74 and 76, rocker arm 86 is caused to rotate about the axis of shaft 38 to thus open and close closure member 34.

Similarly, actuators 78 and 80 are connected to closure member 64 of valve 50 by a pair of connecting rods 88 and 90, respectively, and a rocker arm 92 which is affixed to the end of stubshaft 66. As shown in FIG. 1, the ends of connecting rods 88 and 90 are pivotally connected to the opposite ends of rocker arm 92 so that as the connecting rods move in and out of actuators 78 and 80, rocker arm 92 is caused to rotate about the axis of shaft 66 to thereby open and close closure member 64.

Actuators 74, 76, 78 and 80 communicate with a suitable source of compressed gas by means of conduits 94.

The operation of actuators 74, 76, 78 and 80 is controlled by suitable electro mechanical control units 96, 98, 100 and 102, respectively, which conveniently comprise conventional solenoid-operated valve units. As best shown in FIGS. 1 and 3, each actuator and the associated control unit form a structurally integral actuating unit with the control unit being pivotally connected to one of two L-shaped mounting brackets 104 and 106 attached to the exterior wall of container 12.

Control units 96, 98, 100 and 102 are electrically connected to a programmer 108 by cables 110 and are sequentially energized by the programmer as described hereinbelow.

Container 12 has third and fourth openings 111 and 113 therein (FIG. 3) which are spaced apart along the wall of the container. Connected to the container at openings 111 and 113 are conduits 112 and 114, respectively, which are attached to the wall of the container by any suitable means, such as by welding.

Interposed in conduits 112 and 114 are a third and fourth valve means which conveniently comprise quick-acting butterfly valves 116 and 118, respectively. Valves 116 and 118 are structurally similar to valves 20 and 50 but are of a much smaller size than the latter valves.

Actuating means, including suitable power means are provided for operating valves 116 and 118, such as expansible-chamber pneumatic actuators 120 and 122, respectively. Actuator 120 includes a connecting rod 124 which is pivotally connected to a rocker arm 126. The rocker arm in turn is secured to the end of one of the stubshafts which rotatably support the closure member of valve 116.

Similarly, actuator 122 includes a connecting rod 128 which is pivotally connected to a rocker arm 130. The rocker arm in turn is secured to the end of one of the stubshafts which rotatably support the closure member of valve 118.

Electro mechanical control units 132 and 134 are provided for controlling the operation of actuators 120 and 122, respectively, and conveniently comprise conventional solenoid-operated valve units. As shown in FIG. 1 each of actuators 120 and 122 and the associated control unit form a structurally integral actuating unit, with control units 132 and 134 being pivotally connected to conduits 122 and 114, respectively. Control units 132 and 134 are electrically connected to programmer 108 by cables 136 and are sequentially energized by the programmer as described hereinbelow.

Programmer 108 may be any suitable electro-mechanical, electronic, or electro-uldic programming unit and conveniently comprises an electro-mechanical unit having a plurality of rotary cams and a corresponding mumber of micro-switches which are opened and closed by the cams in the proper sequence for energizing control units 96, 98, 100, 102, 132 and 134 in the desired sequence.

The operation of apparatus 10 will now be described with respect to the use of the apparatus for introducing materials into hermetically sealed vessel 62 from feed hopper 32. In such instance, conduit 114 communicates between chamber 14 and vessel 62, and conduit 112 communicates between chamber 14 and the ambient atmospheric environment in which hopper 32 is exposed or an environment having a similar ambient pressure. Initially, valves 20 and 50 and 118 are closed and valve 116 is opened to equalize the pressure within chamber 14 to ambient pressure. Valve 20 is then opened to admit materials either liquids or particulate solids, into chamber 14 from feed hopper 32 by gravity feed. Both valves 116 and 20 are then closed to hermetically isolate chamber 14 from the ambient atmospheric environment. Valve 118 is then opened to equalize the pressure within chamber 14 to the pressure within vessel 62 which may be greater or lesser than ambient pressure. Valve 50 is then opened to discharge the materials from chamber 14 into vessel 62 by gravity feed. After the materials have passed into vessel 62, valves 50 and 118 are closed to hermetically isolate chamber 14 from the vessel. Valve 116 is then reopened and the foregoing sequence is repeated sequentially to provide a sequential flow of materials from feed hopper 32 into vessel 62 through chamber 14. Programmer 106 energizes control units 96, 98, 100, 102, 132 and 134 in the proper sequence for achieving the desired sequential operation of the valves.

When apparatus 10 is employed for removing materials from a hermetically sealed vessel, the operating sequence of the valves remains the same. In such instance, upper opening 15 of container 12 connunicates with the discharge opening of the vessel and lower opening 17 of the container communicates with an environment having a pressure that is dissimilar from the pressure within the vessel, for example, the environment of the ambient atmosphere. Also, conveniently conduit 112 communicates between chamber 14 and the vessel, and conduit 114 communicates between chamber 14 the ambient atmospheric environment in which the materials are to be discharged from the container or an environment having a similar ambient pressure.

When it is desired to remove materials from the vessel, valves 20, 50 and 118 are initially closed and valve 116 is opened to equalize the pressure within chamber 14 to the pressure within the vessel. Valve 20 is then opened to discharge the materials from the vessel to chamber 14 by gravity feed. Valves 116 and 120 are then closed to hemetically isolate chamber 14 from the vessel. Valve 118 is then opened to equalize the pressure within chamber 14 to ambient pressure and vaave 50 is opened to discharge the materials from chamber 14 to ambient atmospheric environment by gravity feed. Valves 118 and 50 are then closed to hermetically isolate chamber 14 from the ambient atmospheric environment and valve 116 is reopened to again equalize the pressure within chamber 14 to the pressure within the vessel. The foregoing sequence is thereafter repeated for sequentially removing the materials from the vessel.

From the foregoing description it will be appreciated that apparatus 10 is particularly suited for transferring both liquid and particulate solid materials to or from a hermetically sealed vessel from or to an environment having a dissimilar pressure, without destroying the hermetic integrity of the vessel. The apparatus is not subject to the operating and maintenace difficulties associated with the rotary valves which have been commonly used for this purpose. Moreover, the valve means of apparatus 10 are not subject to the thermal expansion problems associated with rotary valves, and thus the apparatus is ideally suited for use in processes wherein the materials being treated and/or one or both of the environments between which the materials are transferred is maintained at an elevated temperature.

Figure 5:
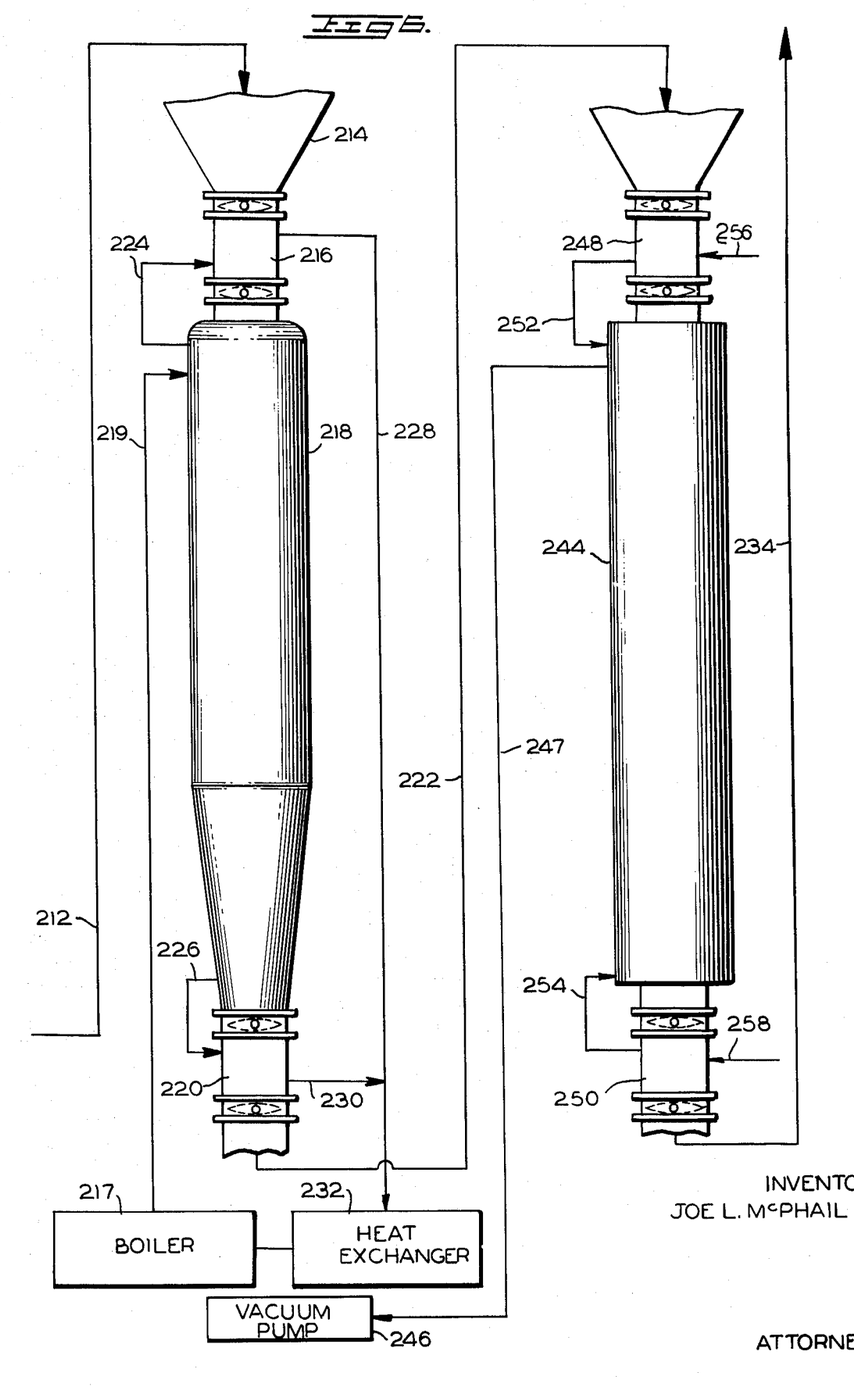
FIG. 5 is a diagramatic flow sheet of a typical process in which the apparatus and method of the invention may be advantageously employed.

An example of a typical process which apparatus 10 may be advantageously employed is shown in FIG. 5. The process shown in FIG. 5. is a continuous process for treating grains, and in particular is a continuous process for parboiling rough rice. In this process the rice is subjected to three basic steps (1) soaking, (2) cooking, and (3) drying. After the rice has been dried, it is ready to be milled or stored as desired.

The parboiling process will now be described in detail with reference to the diagramatic flow sheet shown in FIG. 5. Rough rice having a known moisture content is initially conveyed from storage bins to a plurality of soaking or steeping tanks 200 by a suitable conveying means 202. Tanks 200 are pressurized vessels, each communicating with a source of compressed air by means of a conduit 204 and a source of hot water by means of a conduit 206. The air pressure within tanks 200 is maintained well above atmospheric pressure, and the water temperature within the tanks is maintained well below the vaporization temperature of water.

An individual batch of rough rice is subjected to a complete soaking cycle in each tank 200 before additional rice is admitted to the tank. The desired gatch quantity of rice is introduced into each tank through a suitable valve 208 and removed from the tank through a similar valve 210. Valves 208 and 210 conveniently comprise quick-acting butterfly valves, such as valves 20 and 50 described above. Since the flow of rice into and out of tanks 200 in on a batch, as opposed to a continuous, basis there is no need to provide a means for continuously transferring rice into and out of the tanks.

The soaking cycles performed within tanks 200 are staggered timewise with respect to one another so that a substantially continuous and even flow of rice will be discharged from the tanks. While seven soaking tanks are employed in the process shown in FIG. 5, it will be appreciated that a greater or lesser number of tanks may be employed to provide the desired rate of product flow.

The rice is discharged from tanks 200 onto a suitable conveying means 212 which delivers the soaked rice to a feed hopper 214. Hopper 214 is similar to hopper 32 described above and is exposed to the environment of the ambient atmosphere. The discharge outlet of hopper 214 is connected to the upper end of an apparatus 216 which is similar to apparatus 10 described above. The lower end of apparatus 216 is connected to a receiving inlet of the upper end of a cooker 218 in which the rough rice is cooked on a continuous basis. A discharge outlet at the lower end of cooker 218 is connected to the upper end of an apparatus 220 which is also similar to apparatus 10. The lower end of apparatus 220 communicates with a suitable conveying means 222 onto which the rice is discharged from apparatus 220. As shown in FIG. 5, feed hopper 214, apparatus 216, cooker 218 and apparatus 220 are vertically aligned with one another so that the rice will pass from the feed hopper, through apparatus 216, through the cooker and through apparatus 220 under the influence of gravity.

A boiler 217 is provided which generates steam to be used for cooking the rice. The steam is delivered to cooker 218 by means of a conduit 219. A safety valve 221 and pressure gauge 223 are connected to cooker 218 for controlling and monitoring the pressure of the steam therein.

A pair of conduits 224 and 226 communicate between cooker 218 and apparatuses 216 and 220, respectively, for delivering steam from the cooker to the apparatuses to thereby equalize the pressure within the apparatuses to the pressure within the cooker. A second pair of conduits 228 and 230 communicate between a heat exchanger 232 and apparatuses 216 and 220, respectively for delivering water vapor from the apparatuses to the heat eschanger to thereby equalize the pressure within the apparatuses to the pressure within the heat exchanger. The interior of heat exchanger 232 is maintained at ambient pressure, thus, when conduits 228 and 230 are opened the pressure within apparatuses 216 and 220 is equalized to ambient pressure. Water vapor from apparatuses 216 and 220 is recondensed in heat exchanger 232 to provide make-up water for boiler 217.

The quality of parboiled rice is known to be directly related to the pressure at which the rice is cooked. Generally, higher cooking pressures produce a better quality finished product.

Heretofore cooking pressures have been limited by the lack of a suitable means for introducing and removing the rice from the cooker while maintaining the hermetic integrally thereof. The rotary valves which have been used for the purpose are subject to the operating and maintenance difficulties discussed above. These difficulties are magnified in cooking pressures even slightly greater than ambient pressure are employed.

Such difficulites are obviated by the use of apparatuses 216 and 220, which, as described above with respect to apparatus 10, are ideally suited for transferring rice into and out of steam pressurized cooker 218. In operation apparatuses 216 and 220 sequentially introduce and remove rice from the cooker on a continuous basis to provide the desired rate of product flow.

After the rice is discharged from apparatus 220 onto conveying means 222, it is delivered by the conveying means to a pair of tandem-operated rotary dryers 233. Dryers 233 conveniently comprise conventional forced flow hot air dryers in which the moisture content of the cooked rice is reduced.

From dryers 233, the rice is transferred by a suitable conveying means 234 to a series of tempering bins 236 and bin dryers 238. The tempering bins and bin dryers are alternated so that the rice passes serially from a tempering bin into a dryer and from a dryer into a tempering bin. The process shown in FIG. 5 employs four tempering bins 236 and four bin dryers 238, but it will be appreciated that a greater or lesser number of either may be employed if desired. The rice is transferred between the tempering bins and bin dryers by suitable conveying means 240, and after passing through the final drying stage is transferred to a milling process or storage bin by a suitable conveying means 242.

The rice parboiling process shown in FIG. 5 is merely one of many processes in which the apparatus and method of the invention may be advantageously employed. Many continuous processes require that a liquid or particulate solid material be transferred into and out of a hermetically seated vessel in which a pressure other than ambient pressure is maintained. The apparatus of the invention is ideally suited for this purpose and purticularly where elevated temperatures are encountered.

Figure 6:
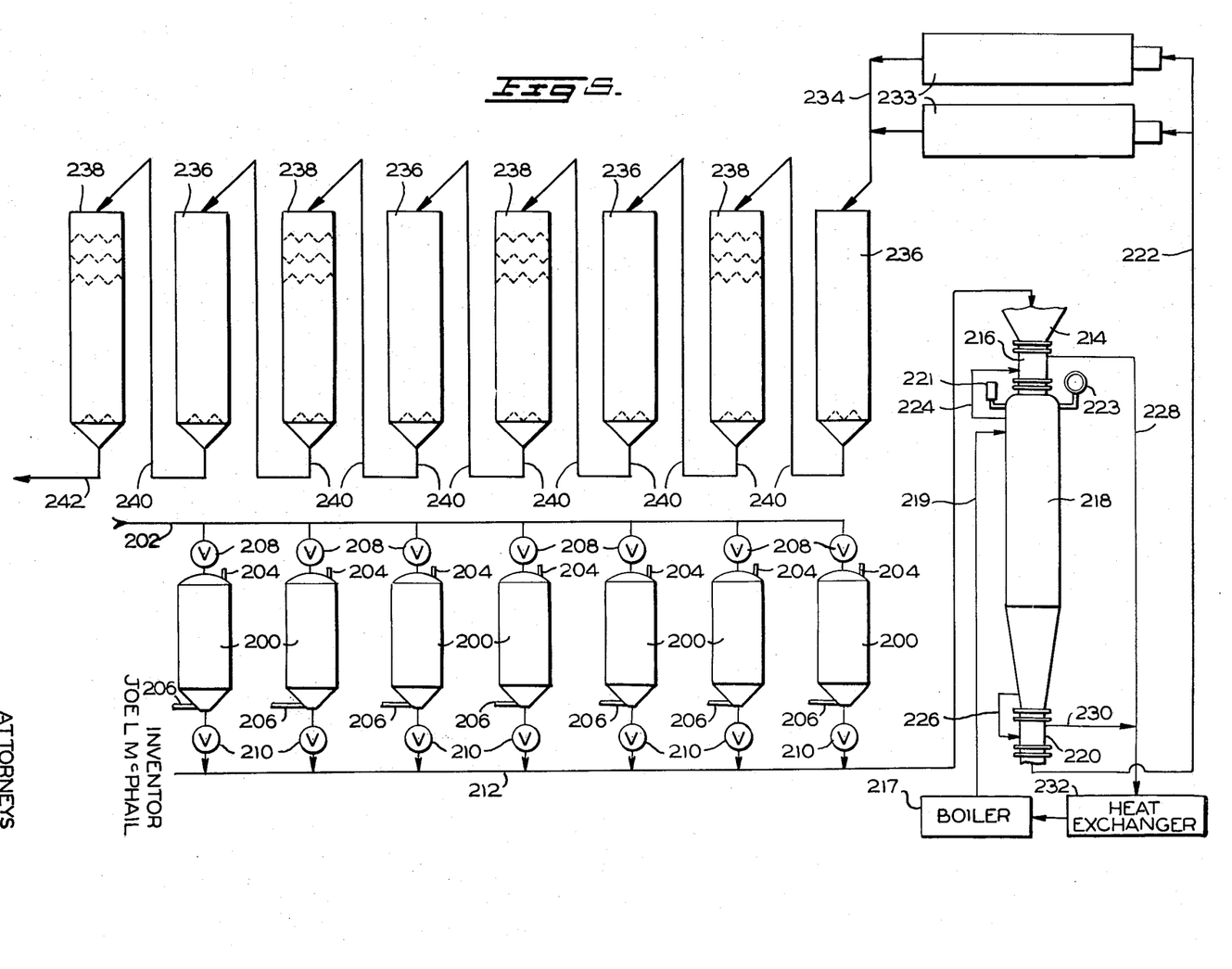
FIG. 6 is a diagramatic flow sheet of a portion of the process shown in FIG. 5, further showing a modification of the process.

A modification of the process shown in FIG. 5 is shown in FIG. 6. The process shown in FIG. 6 is identical to the process shown in FIG. 5 except that a hermetically sealed vacuum dryer 244 is substituted for rotary dryers 233. A vacuum pump 216 communicates with dryer 244 by means of a conduit 247 for producing a vacuum environment within the dryer.

Apparatuses 248 and 250, which are similar to apparatuses 10, 216 and 220 described above, are connected to the inlet and outlet, respectively, of dryer 244 for transferring the rice into and out of the dryer.

A pair of conduit 252 and 254 communicate between dryer 244 and apparatuses 248 and 250, respectively, for equalizing the pressure within the apparatuses to the pressure within the dryer. A second pair of conduits 256 and 258 communicate between the environment of the ambient atmosphere and apparatuses 248 and 250, respectively, for equalizing the pressure within the apparatuses to ambient pressure. The operation of apparatuses 248 and 250 is identical to the operation of apparatus 10 described above.

If desired, apparatus 220 may communicate directly between cooker 218 and dryer 244. In such instance the cooker preferably would be positioned directly above the dryer so that rice will be transferred from apparatus 220 into the dryer by gravity feed. Also, conduit 230 would communicate between dryer 244 and apparatus 220 for equalizing the pressure within apparatus 220 to the pressure within the dryer.

After the rice is discharged from apparatus 250, it is received by conveying means 234 and delivered thereby to tempering bins 236 and bin dryers 238 as described above.

The modified parboiling process shown in FIG. 6 illustrates the use of the apparatus of the invention with both a pressurized vessel, steam cooker 218, and a vacuum vessel, vacuum dryer 244.

Figure 7:
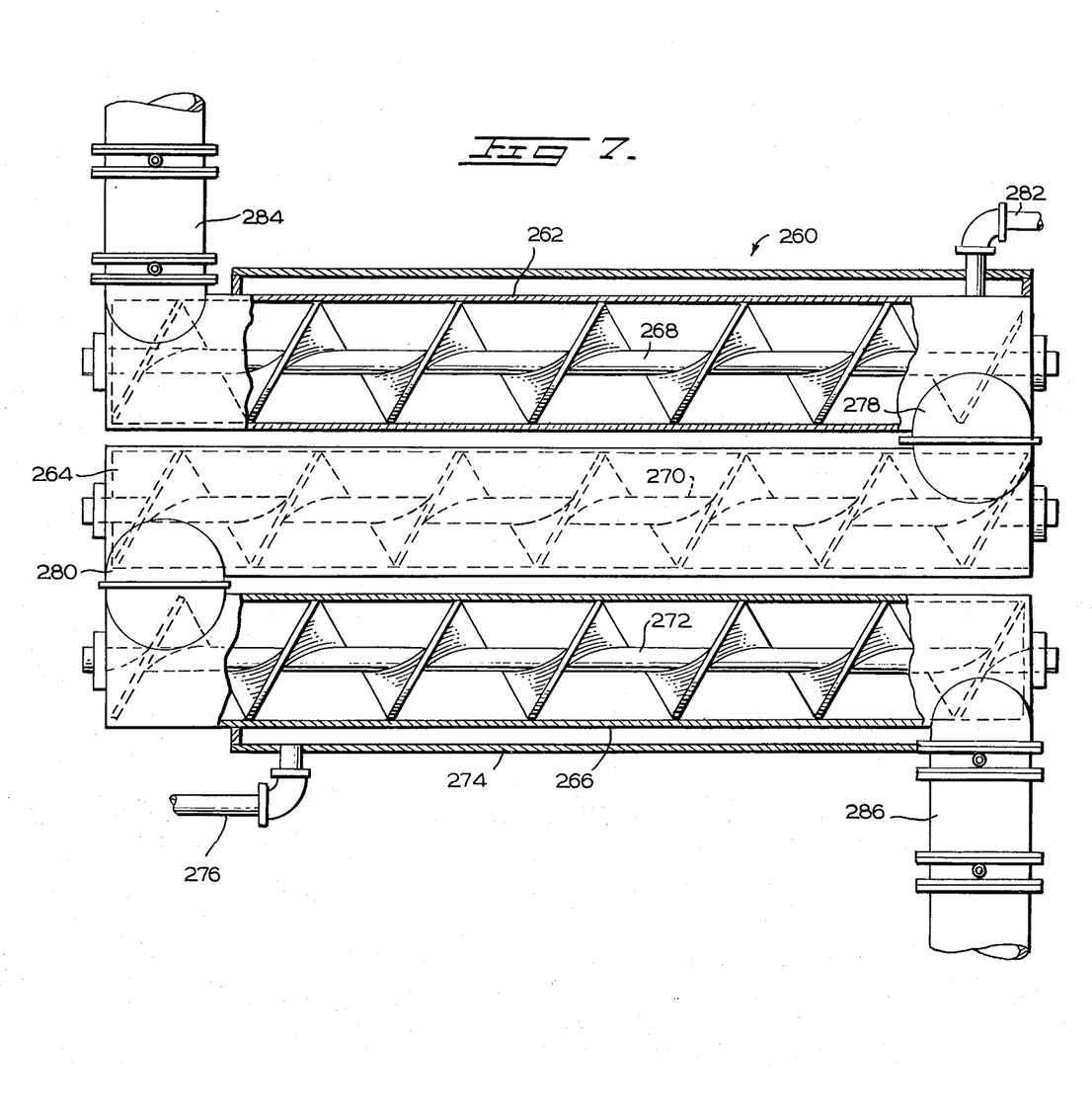
FIG. 7 is a sectional view of a particular type of hermetically sealed vessel with which the apparatus and method of the invention may be advantageously employed.

The use of the apparatus of the invention with a different type of vacuum vessel is shown in FIG. 7. The vessel shown in FIG. 7 is a horizontal flow vacuum dryer 260 which comprises three drying chambers 262, 264 and 266, three screw conveyors 268, 270 and 272 disposed within chambers 262, 264 and 266, respectively, for conveying materials through the chambers, and a steam jacket 274 which surrounds the drying chambers. Suitable conventional means (not shown) are provided for driving conveyors 268, 270 and 272. A conduit 276 is connected to steam jacket 274 for delivering steam to the interior of the steam jacket to provide the heat required for drying materials and they pass through chambers 262, 264 and 266.

Chambers 262 communicates with chamber 264 through a connector 278, and chamber 264 communicates with chamber 266 through a similar connector 280, so that a common environment exists within the chambers.

A conduit 282 is connected to chamber 262 and communicates between the interior of chambers 262, 264 and 266, and a vacuum pump (not shown) which produces a vacuum environment within the chambers.

apparatus 284, similar to appartaus 10 described above, is connected to the receiving inlet of chamber 262 for delivering materials into the dryer, and a similar apparatus 286 is connected to the discharge outlet of chamber 266 for removing the materials from the dryer. Apparatuses 284 and 286 sequentially introduce materials into and remove materials from the dryer to provide a continuous flow of materials there through.

Dryer 260 is particularly adapted for use in a solvent extraction process, such as the extraction of solvents from soy bean or cotton seed meal. In such processes a solvent, such as hexane, conventionally is added to the product to dissolve and absorb the natural oils therein. The wetted meal of mucella is then separated from the solvent-oil solution as by filtering. The mucella is thereafter dried in a dryer similar to vacuum dryer 260 in which the impregnated solvent is extracted therefrom and recondensed for use in the process again. With respect to dryer 260, evaporated solvent is removed from chambers 262, 264 and 266 through conduit 282 by the vacuum pump for delivery to a suitable recondenser.

The specific uses of the apparatus and method of the invention described above in connection with FIGS. 5-9 merely illustrate a few of the many processes in which the invention may be advantageously employed. For example, the invention may be used in continuous fumigation or bleaching processes, such as the fumigation or bleaching of flours.

Further, while the processes specifically described concern the treatment of agricultural products and by-products such as grains, cereal grains, legumes and seeds. It will be apparent that the invention is adaptable for use in a wide variety of processes in which particulate solid or liquid materials are to be treated on a continuous basis in a hermetically sealed vessel.

Moreover, the apparatus of the invention is not susceptible to the operating and maintenance difficulties associated with the known means for accomplishing the function, such as rotary valves, and is particularly adaptable for use in processes where the materials being handled and/or one or both of the environments between which the materials are transferred is maintained at an elevated temperature.

While the foregoing constitutes a detailed description of a preferred embodiment of the invention, it is appreciated that various modifications thereof will occur to those skilled in the art. Therefore, the scope of the invention is to be limited solely by the scope of the appended claims.

I claim:

1. In the method of parboiling rice which comprises soaking, cooking and drying the rice, the improvement comprising transferring soaked rice maintained at ambient pressure to a cooking vessel, said cooking vessel being at a pressure higher than the ambient pressure environment in which said soaked rice is maintained by:
   a. equalizing the pressure within a container to ambient pressure;
   b. opening a first butterfly valve means connected to said container and communicating between said ambient pressure environment and container to transfer the soaked rice into the container from said environment by operating a first power means for opening and closing said first valve means, said first power means being positioned externally of the container, said first valve means having a closure member movably positioned within the body of said first valve means;
   c. closing said first valve means to hermetically seal said container by frictionally engaging the closure member of said first valve means with a resilient annular rubber seal positioned within the body of said first valve means, said closure member of said first valve means engaging only said first annular seal for closing the first valve means so that the materials will not be crushed;
   d. equalizing the pressure within said container to the pressure within said vessel;
   e. opening a second butterfly valve means connected to said container and communicating between the container and vessel to transfer the soaked rice directly into the vessel from the container through said second valve means by operating a second power means for opening and closing said second valve means, said second power means being positioned externally of the container, said second valve means having a closure member movably positioned within the body of said second valve means; and
   f. closing said second valve means to hermetically seal said container and said vessel by frictionally engaging the closure member of said second valve means with a second resilient annular rubber seal positioned within the body of said second valve means, said closure member of said second valve means engaging only said second annular seal for closing the second valve means so that the soaked rice will not be crushed.

2. The method of claim 1 wherein said steps (a) – (f) are cyclically repeated at least one time.

3. A method for sequentially transferring relatively fragile cooked rice from a hermetically sealed elevated pressure cooking vessel to an environment having ambient pressure without damaging or contaminating said cooked rice or destroying the hermetic integrity of the vessel, comprising the sequential steps of:
   a. equalizing the pressure within a container to the pressure within said cooking vessel;
   b. opening a first butterfly valve means connected to said container and communicating between said cooking vessel and container to transfer the cooked rice directly through said valve means into the container from said cooking vessel by operating a first power means for opening and closing said first valve means, said first power means being positioned externally of the container so that said cooked rice will not be contaminated by contacting said first power means, said first valve means having a closure member movably positioned within the body of said first valve means;
   c. closing said first valve means to hermetically seal said container and said vessel by frictionally engaging the closure member of said first valve means with a first resilient annular rubber seal positioned within the body of said first valve means, said closure member of said first valve means engaging only said first annular seal for closing the first valve means so that said cooked rice will not be crushed;
   d. equalizing the pressure within the container to ambient pressure;
   e. opening a second butterfly valve means connected to said container and communicating between the container and said ambient pressure environment to transfer the rice to said environment from the container by operating a second power means for opening and closing said second valve means, said second power means being positioned externally of the container so that the rice will not be contaminated by contacting said second power means, said second valve means having a closure member movably positioned within the body of said second valve means; and
   f. closing said second valve means to hermetically seal the container by frictionally engaging the closure member of said second valve means with a second resilient rubber seal positioned within the body of said second valve means, said closure member of said second valve means engaging only said second annular seal for closing the second valve means so that the rice will not be crushed.

4. The method of claim 3 wherein said steps (a) – (f) are cyclically repeated at least one time.

5. A method for parboiling rice by sequentially transferring relatively fragile presoaked rice to a hermetically sealed cooking vessel from an environment having a pressure dissimilar from the pressure within the vessel without damaging or contaminating said rice or destroying the hermetic integrity of the vessel, comprising the sequential steps of:
   a. equalizing the pressure within a first container to said dissimilar pressure;
   b. opening a first butterfly valve means connected to said first container and communicating between said dissimilar pressure environment and said first container to transfer the presoaked rice into the first container from said environment by operating a first power means for opening and closing said first valve means, said first power means being positioned externally of the first container, said first valve means having a closure member movably positioned within the body of said first valve means;
   c. closing said first valve means to hermetically seal said container by frictionally engaging the closure member of said first valve means with a first resilient annular rubber seal positioned within the body of said first valve means, said closure member of said first valve means engaging only said first annular seal for closing the first valve means so that the materials will not be crushed;
   d. equalizing the pressure within said first container to the pressure within said cooking vessel, said pressure within said cooking vessel being greater than ambient atmospheric pressure;
   e. opening a second butterfly valve means connected to said first container and communicating between the first container and cooking vessel to transfer the presoaked rice directly through said second valve means into the cooking vessel from the first container by operating a second power means for opening and closing said second valve means, said second power means being positioned externally of the first container, said second valve means having a closure member movably positioned within the body of said second valve means;
   f. closing said second valve means to hermetically seal said first container and said cooking vessel by frictionally engaging the closure member of said second valve means with a second resilient annular rubber seal positioned within the body of said second valve means, said closure member of said second valve means engaging only said second annular seal for closing the second valve means so that the rice will not be crushed;
   g. equalizing the pressure within a second container to the pressure within said vessel;
   h. opening a third butterfly valve means connected to said second container and communicating between the vessel and second container to transfer the cooked rice directly through said third valve means into the container from the vessel by operating a third power means for opening and closing said third valve means, said third power means being positioned externally of the container, said third valve means containing a closure member movably positioned within the body of said third valve means;
   i. closing said third valve means to hermetically seal said vessel and said second container by frictionally engaging the closure member of said third valve means with a third resilient annular rubber seal positioned within the body of said third valve means, said closure member of said third valve means engaging only said third annular seal for closing the third valve means so that the cooked rice will not be crushed;
   j. equalizing the pressure within the second container to said dissimilar pressure;
   k. opening a fourth butterfly valve means connected to said second container and communicating between the second container and said dissimilar pressure environment to transfer the rice at said dissimilar pressure to said environment from the container by operating a fourth power means for opening and closing said fourth valve means, said fourth power means being positioned externally of the second container, said fourth valve means containing a closure member movably positioned within the body of said fourth valve means; and
   l. closing said fourth valve means to hermetically seal the second container by frictionally engaging the closure member of said fourth valve means with a fourth resilient annular rubber seal positioned within the body of said fourth valve means, said closure member of said fourth valve means engaging only said fourth annular seal for closing the fourth valve means so that the cooked rice will not be crushed.

6. The process of claim 5 wherein said steps (a) – (l) are cyclically repeated at least one time.

7. A method for sequentially transferring relatively fragile particulate agricultural products selected from the group consisting of grains, cereal grains, legumes and seeds to a hermetically sealed vessel from an environment having a pressure dissimilar from the pressure within the vessel without damaging or contaminating said materials or destroying the hermetic integrity of the vessel, comrising the sequential steps of:
   a. equalizing the pressure within a container to said dissimilar pressure;
   b. opening a first butterfly valve means connected to said container and communicating between said dissimilar pressure environment and container to transfer the materials into the container from said environment by operating a first power means for opening and closing said first valve means, said first power means being positioned externally of the container so that the materials will not be contaminated by contacting said first power means, said first valve means having a closure member movably positioned within the body of said first valve means;
   c. closing said first valve means to hermetically seal said container by frictionally engaging the closure member of said first valve means with a first resilient annular rubber seal positioned within the body of said first valve means, said closure member of said first valve means engaging only said first annular seal for closing the first valve means so that the materials will not be crushed;
   d. equalizing the pressure within said container to the pressure within said vessel;

e. opening a second butterfly valve means connected to said container and communicating between the container and vessel to transfer the materials directly through said second valve means into the vessel from the container by operating a second power means for opening and closing said second valve means, said second power means being positioned externally of the container so that the materials will not be contaminated by contacting said second power means, said second valve means having a closure member movably positioned within the body of said first valve means;

f. closing said second valve means to hermetically seal said container and said vessel by frictionally engaging the closure member of said second valve means with a second resilient annular rubber seal positioned within the body of said second valve means, said closure member of said second valve means engaging only said second annular seal for closing the second valve means so that the materials will not be crushed; and g. cyclically repeating steps (a)–(f) at least one time.

8. A method as recited in claim 7 wherein said material is a grain.

9. A method as recited in claim 8, wherein said material is rice.

10. A method as recited in claim 7, wherein said material is a cereal grain.

11. A method as recited in claim 7, wherein said material is a legume.

12. A method as recited in claim 7, wherein said material is seed.

13. A method as recited in claim 7, wherein the pressure within said vessel is greater than ambient atmospheric pressure.

14. A method as recited in claim 7, wherein the pressure within said vessel is lesser than ambient atmospheric pressure.

15. A method of sequentially transferring relatively fragile particulate agricultural products selected from the group consisting of grains, cereal grains, legumes and seeds from a hermetically sealed vessel to an environment having a pressure dissimilar from the pressure within the vessel without damaging or contaminating said materials or destroying the hermetic integrity of the vessel, comprising the sequential steps of:

a. equalizing the pressure within a container to the pressure within said vessel;

b. opening a first butterfly valve means connected to said container and communicating between the vessel and container to transfer the materials directly through said first valve means into the container from the vessel by operating a first power means for opening and closing said first valve means, said first power means being positioned externally of the container so that the materials will not be contaminated by contacting said first power means, said first valve means having a closure member movably positioned within the body of said first valve means;

c. closing said first valve means to hermetically seal said container and said vessel by frictionally engaging the closure member of said first valve means with a first resilient annular rubber seal positioned within the body of said first valve means, said closure member of said first valve means engaging only said first annular seal for closing the first valve means so that the materials will not be crushed;

d. equalizing the pressure within the container to said dissimilar pressure;

e. opening a second butterfly valve means connected to said container and communicating between the container and said dissimilar pressure environment to transfer the materials to said environment from the container by operating a second power means for opening and closing said second valve means, said second power means being positioned externally of the container so that the materials will not be contaminated by contacting said second power means, said second valve means having a closure member movably positioned within the body of said first valve means;

f. closing said second valve means to hermetically seal the container by frictionally engaging the closure member of said second valve means with a second resilient annular rubber seal positioned within the body of said second valve means, said closure member of said second valve means engaging only said second annular seal for closing the second valve means so that the materials will not be crushed; and g. cyclically repeating steps (a)–(f) at least one time.

16. A method as recited in claim 15, wherein the pressure within said vessel is greater than ambient atmospheric pressure.

17. A method as recited in claim 15, wherein the pressure within said vessel is lesser than ambient atmospheric pressure.

* * * * *